US008258850B1

(12) United States Patent
Pagnanelli et al.

(10) Patent No.: US 8,258,850 B1
(45) Date of Patent: Sep. 4, 2012

(54) CONFIGURABLE ANALOG SIGNAL PROCESSOR

(75) Inventors: Christopher Jude Pagnanelli, Huntington Beach, CA (US); William W. Jones, Aliso Viejo, CA (US)

(73) Assignee: Interstate Electronics Corporation, Anaheim, CA (US)

( * ) Notice: Subject to any disclaimer, the term of this patent is extended or adjusted under 35 U.S.C. 154(b) by 124 days.

(21) Appl. No.: 12/854,857

(22) Filed: Aug. 11, 2010

Related U.S. Application Data

(60) Provisional application No. 61/233,454, filed on Aug. 12, 2009.

(51) Int. Cl.
*G06F 7/64* (2006.01)
*G06G 7/18* (2006.01)
*G06G 7/19* (2006.01)

(52) U.S. Cl. ........................................ 327/337; 327/91

(58) Field of Classification Search ................. 327/336, 327/337, 91, 94–96
See application file for complete search history.

(56) References Cited

U.S. PATENT DOCUMENTS

2010/0019842 A1* 1/2010 Larson et al. .................... 330/9
2011/0001518 A1* 1/2011 Debnath et al. ................. 327/96

* cited by examiner

*Primary Examiner* — Quan Tra
(74) *Attorney, Agent, or Firm* — Knobbe, Martens, Olson & Bear LLP

(57) ABSTRACT

A general-purpose Analog Signal Processing System (ASPS) is disclosed. An ASPS can be realized though an array of Configurable Integrator Blocks (CIBs). The CIBs can be identical to each other, and arranged in rows and columns. A CIB can merge multiplication, integration, and sample-and-hold functions into a single programmable circuit block. Within the ASPS, CIBs are interconnected in a manner that allows CIB inputs to be a combination of external signals and outputs of other CIBs, and allows CIB outputs to be combined to produce system (external) outputs or inputs to other CIBs. This networked architecture combined with the basic functionality of each CIB, enables implementation of a broad range of analog signal processing operations. The ASPS can be field programmable. The field programmability permits end users to be able to quickly and inexpensively fabricate customized analog integrated circuits.

17 Claims, 5 Drawing Sheets

CONFIGURABLE ANALOG SIGNAL PROCESSOR

CROSS-REFERENCE TO RELATED APPLICATION

This application claims the benefit under 35 U.S.C. §119 (e) of U.S. Provisional Application No. 61/233,454, filed Aug. 12, 2009, the entirety of which is hereby incorporated by reference.

BACKGROUND

1. Field of the Invention

Embodiments of the invention generally relate electronics, and in particular, to configurable analog circuits.

2. Description of the Related Art

Signal processing can be implemented using digital circuits or analog circuits. Analog signal processing techniques can offer useful advantages over their digital counterparts. These advantages can include, but are not limited to: higher dynamic range, greater precision, and lower power dissipation.

There are applications in which the advantages of analog signal processing become particularly relevant. One important area is that of robust data transmission in hostile environments with high dynamic range. For example, high-power jammers can overwhelm an analog-to-digital converter of a receiver front-end in a DSP-based communication system. Other important areas are in RADAR and in covert spectral analysis, in which high-power transmission and/or low-level receive signals necessitate very high dynamic range receivers. Also, in space borne or in portable systems, the lower power dissipation/consumption of analog signal processors can be advantageous.

SUMMARY

A relatively low-power, general-purpose Analog Signal Processing System (ASPS) can be realized though an array of Configurable Integrator Blocks (CIBs). In one embodiment, the CIBs are identical to each other, and are arranged in rows and columns. In one embodiment, each CIB merges multiplication, integration, and sample-and-hold functions into a single programmable circuit block. Within the ASPS, CIBs are interconnected in a manner that allows CIB inputs to be a combination of external signals and outputs of other CIBs, and allows CIB outputs to be combined to produce system (external) outputs or inputs to other CIBs. This networked architecture combined with the basic functionality of each CIB, enables implementation of a broad range of analog signal processing operations. In one embodiment, the ASPS is field programmable. The field programmability permits end users to be able to quickly and inexpensively fabricate customized analog integrated circuits.

One embodiment includes an apparatus including a programmable analog circuit, wherein the programmable analog circuit includes: an analog input node configured to receive an analog input signal; a plurality of controlled current sources, wherein each controlled current source has an output current that is controlled by the analog input signal; a plurality of current-steering switches, wherein each current-steering switch has at least a first switch node and a second switch node, wherein each current-steering switch is paired with a corresponding controlled current source of the plurality of controlled current sources so that each controlled current source output is coupled to a respective first switch node, wherein each current-steering switch is configured to selectively enable or disable conduction between the first switch node and the second switch node based at least partly on a state of a respective a digit of a digital signal; and an output transconductance amplifier (OTA) circuit having a first input coupled to second switch nodes of the plurality of current-steering switches.

One embodiment includes a method of providing a programmable analog circuit, wherein the method includes: receiving an analog input signal at an analog input node; providing a plurality of controlled currents, wherein each controlled current is controlled by the analog input signal; selectively switching the controlled currents based at least partly on states of digits of a digital signal; summing the selectively switched controlled currents at an input node of an output transconductance amplifier (OTA) circuit.

One embodiment includes an apparatus for providing a programmable analog circuit, wherein the apparatus includes: an analog input node configured to receive an analog input signal; means for providing a plurality of controlled currents, wherein each controlled current is controlled by the analog input signal; means for selectively switching the controlled currents based at least partly on states of digits of a digital signal; means for summing the selectively switched controlled currents; and an output transconductance amplifier (OTA) circuit having an input coupled to the selectively switched controlled currents.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

Figure 1:
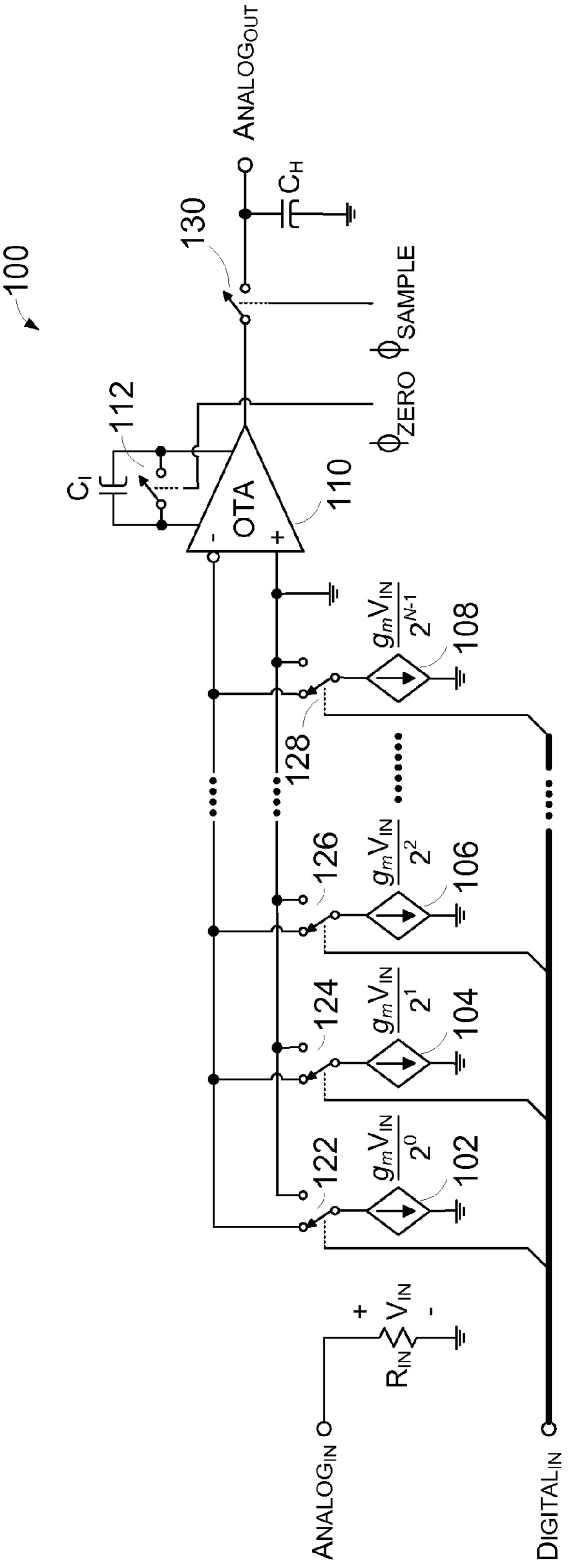
FIG. 1 illustrates a block diagram of a configurable integration block (CIB).

A functional diagram for one embodiment of a configurable integrator block (CIB) 100 is illustrated in FIG. 1. The operation of the illustrated embodiment of the CIB 100 will now be described. A voltage $V_{IN}$ that is applied to an analog input $ANALOG_{IN}$ simultaneously modulates or controls a set of N continuous-time, binary-weighted current sources 102, 104, 106, 108 in a controlled current source manner, producing a proportional output current $ANALOG_{OUT}$ via an operational transconductance amplifier (OTA) 110. For example, when the switch 112 in the feedback path of the OTA 110 is open and with N switches 122, 124, 126, 128 set to select the inverting input of the OTA 110, the output current is related to the input voltage according to Equation 1.

$$Analog_{OUT}(s) = \frac{g_m \cdot g'_m}{C_I} \cdot \frac{1}{s} \cdot Analog_{IN}(s) \quad \text{Equation 1}$$

In Equation 1, $g_m$ represents the transconductance of the voltage-controlled, binary-weighted current sources 102, 104, 106, 108, $g'_m$ represents the transconductance of the OTA 110, and $C_I$ represents the integrator capacitance. As will be explained later, a state of a digital signal $DIGITAL_{IN}$ controls the selection of the N switches 122, 124, 126, 128 and determines a weight w, resulting in the relationship expressed in Equation 2.

$$Analog_{OUT}(s) = \frac{wg_m \cdot g'_m}{C_I} \cdot \frac{1}{s} \cdot Analog_{IN}(s) \quad \text{Equation 2}$$

As Equation 1 and Equation 2 indicate, the CIB 100 can be configured to generate an output current that is proportional to the integral of the input voltage.

The illustrated embodiment uses N binary-weighted current sources, but an alternate embodiment can use $2^N$ unary-weighted current sources, that is, $2^N$ matched current sources. Although a unary weighted embodiment has more current sources than an embodiment using N binary-weighted current sources, techniques for arranging unary-weighted current sources in a manner to minimize current source matching errors that result from linear and even gradients across an integrated circuit wafer are well-known. An example of such a technique is a common centroid configuration that combines vertical and horizontal nesting. In one embodiment, the value of N is greater than or equal to 10 to reduce current quantization noise at the OTA output. However, the value of N can vary in a very broad range and other applicable values of N will be readily determined by one of ordinary skill in the art. Also, conventional techniques for implementing stable and accurate integrated circuit current sources, based on, for example, band gap references, can be used. In the illustrated embodiment, voltage-controlled current sources 102, 104, 106, 108 are used. In an alternative embodiment, current-controlled current sources can be used. As used herein, the term "current source" is applicable to either a current "source" or a current "sink." The N controlled current sources of FIG. 1 are labeled with the respective currents:

$$\frac{g_m V_{in}}{2^0}, \frac{g_m V_{in}}{2^1}, \frac{g_m V_{in}}{2^2}, \ldots \frac{g_m V_{in}}{2^{N-1}}.$$

In the illustrated embodiment, the binary-weighted current sources pull current from an integrating current amplifier OTA 110 or from ground or to another voltage reference depending on the states of N switches 122, 124, 126, 128 that are controlled by a digital signal $DIGITAL_{IN}$. The state of the digital signal $DIGITAL_{IN}$ determines the weight w described earlier. The resulting current at the inverting input of the integrating amplifier OTA 110 is equal to the product of the continuous-time analog input $ANALOG_{IN}$ or $V_{IN}$, the discrete-time digital signal $DIGITAL_{IN}$, and the transconductance $g_m$. Depending on the application, the digital signal $DIGITAL_{IN}$ can be constant or relatively slowly changing, or can be time-varying, such as a signal that is periodic or pseudo-random in nature. Furthermore, the digital signal $DIGITAL_{IN}$ can be received from an external signal, or can be generated internally from within the analog signal processing system, such as based on a signal from a waveform or signal generator, which, in one example, includes a numerically-controlled oscillator and waveform mapping memory device.

The output of the CIB 100 is a current-mode signal that is produced by an integrating current amplifier OTA 110, reset switch 112, integration capacitor $C_I$, sampling switch 130, and sampling capacitor $C_H$. The reset switch 112 is across (parallel with) the integration capacitor $C_I$. The sampling switch 130 is in a signal path between the integrating current amplifier OTA 110 and the hold sampling capacitor $C_H$.

The illustrated embodiment of the CIB 100 has three modes of operation: linear gain mode, integration mode, and sample-and-hold mode.

In the linear gain mode, the integration function within the integrating current amplifier OTA 100 is disabled and the amplifier output $ANALOG_{OUT}$ corresponds to a continuous-time signal with fixed current gain from input to output. In addition, in the linear gain mode, the reset switch 112 is closed, and the sampling switch 130 is closed.

In the integration mode, the output current is proportional to the integral of the input current, and the integration time is determined by the reset switch 112 that, when closed, zeroes the integrator (reset capacitor $C_I$) based on a state of a digital control signal $\Phi_{ZERO}$. When the reset switch 112 is open, the integration capacitor $C_I$ integrates to a value that is proportional to the product of the analog input $ANALOG_{IN}$ and the digital signal $DIGITAL_{IN}$.

In the sample-and-hold mode, the CIB output is a discrete-time current waveform based on a zero-order hold transfer function. The sample-and-hold mode permits an output $ANALOG_{OUT}$ to be provided while the integrator is being reset or is in the process of integrating data.

In one embodiment, the integration period, the sample time, and the hold interval of the integrating amplifier are programmable, which permits the CIB 100 to be able to form the basis for multiple signal processing functions. Excluding the sample-and-hold function, the overall continuous-time output current of the CIB 100 is expressed in Equation 3.

$$i_{OUT}(s) = \frac{1}{s\tau} \cdot i_{IN}(s) = \frac{i_{IN}(s)}{sK\, C_I / Digital_{IN}} \quad \text{Equation 3}$$

In Equation 3, $\tau$ is directly proportional to the integrator capacitance value (value of $C_I$) and inversely proportional to the digital signal $DIGITAL_{IN}$ value according to a constant of proportionality K that is dependent on: 1) the transconductance of the switched current sources $$\frac{g_m V_{in}}{2^0}, \frac{g_m V_{in}}{2^1}, \frac{g_m V_{in}}{2^2}, \ldots \frac{g_m V_{in}}{2^{N-1}};$$

2) the transconductance of the output amplifier OTA stage 110; and 3) the CIB input resistance $R_{IN}$. Including the sample-and-hold, the overall discrete-time output current of the CIB 100 is expressed in Equation 4.

$$i_{OUT}(t_0) = \frac{1}{K \cdot C_I} \sum_{j=0}^{m} i_{IN}(jT_S) \cdot Digital_{IN}(jT_S) \cdot T_S \quad \text{Equation 4}$$

In Equation 4, $t_0$ is the sample time (determined by signal $\phi_{SAMPLE}$), $T_S$ is the integration period (determined by signals $\phi_{ZERO}$ and $\phi_{SAMPLE}$), and $i_{IN}(jT_S)$ is the narrow-pulse-sampled input current.

Applications for Analog Signal Processor

The Configurable Integration Block (CIB) 100 can form the core of an Analog Signal Processor System (ASPS), which due to the top-level CIB-array architecture and the programmable functionality of the CIB 100 itself, is capable of performing a wide variety of signal processing tasks. For example, by taking advantage of a CIB's capability for taking, as its input, a combination of external signals and/or other CIB outputs, the ASPS can be configured to implement continuous-time filtering responses based on an integrator block approach.

Low-Pass Filter Example

Figure 2:
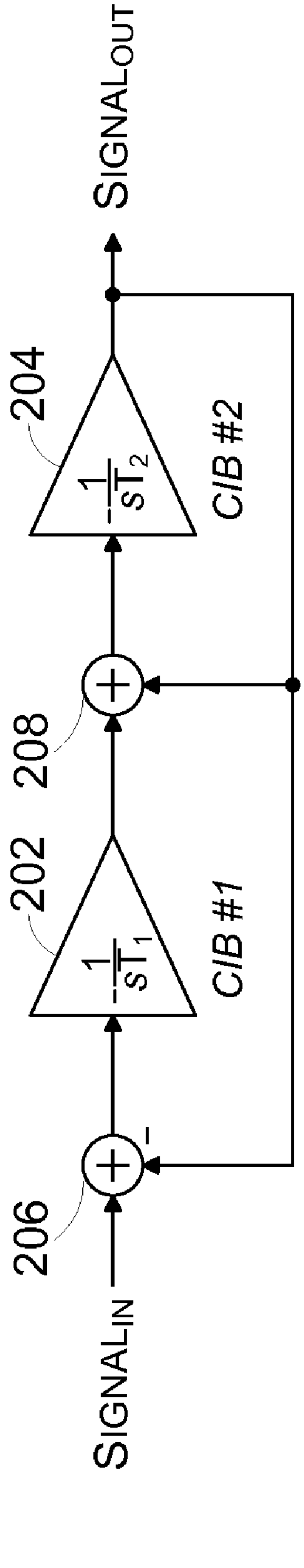
FIG. 2 illustrates an example of a continuous-time analog filter implemented with CIBs.

FIG. 2 is a block diagram of a second-order low-pass filter that can be implemented using two CIB resources 202, 204, in which each CIB 202, 204 has been configured to perform continuous-time integration. An output signal $SIGNAL_{OUT}$ is subtracted 206 from an input signal $SIGNAL_{IN}$, and the result is provided as an input to the first CIB 202. The output signal $SIGNAL_{OUT}$ is added 208 to the output of the first CIB 202 and provided as an input to the second CIB 204. For example, a third CIB can be configured as a unity-gain inverter and used to perform the subtraction operation.

Besides continuous-time filtering, other applications for the ASPS technology include analog Fourier transforming, arbitrary waveform generation/modulation, analog spectrum analysis, frequency-domain filtering, circular convolution, and cosine transform-based image compression.

Inverse Fourier Transform Example

Figure 3:
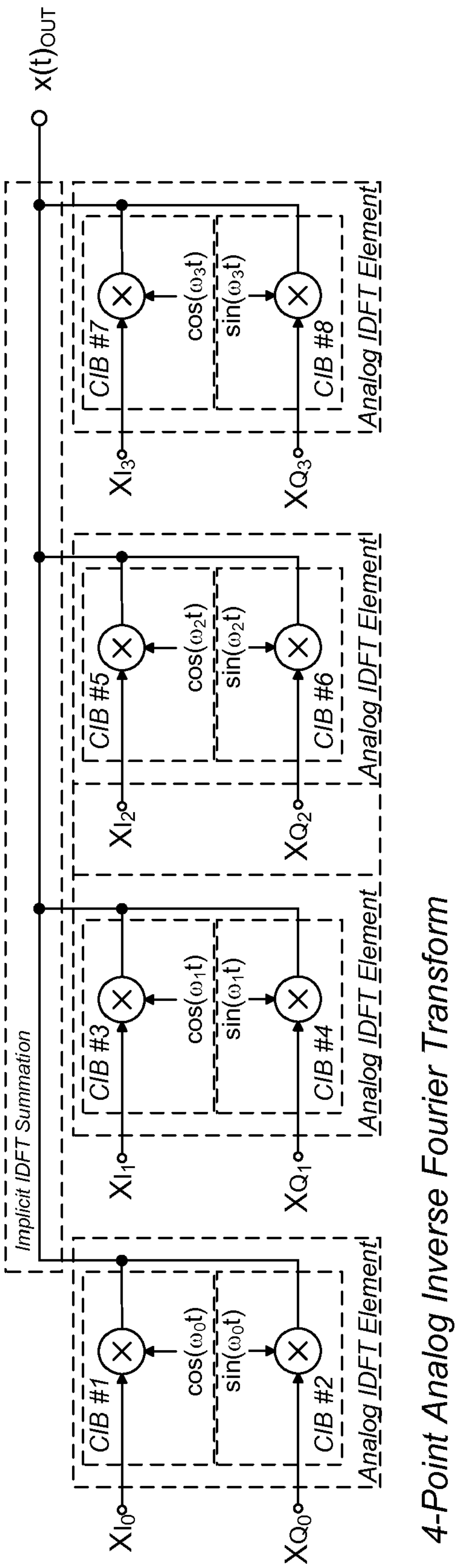
FIG. 3 illustrates an example of a 4-point analog inverse discrete Fourier transform, real part processor implemented with CIBs.

For example, FIG. 3 is a block diagram of a circuit for computing the real part of a 4-point analog inverse discrete Fourier transform (IDFT), using eight CIBs (CIB #1 to CIB #8) and the ability to receive an arbitrary waveform for the digital signal $DIGITAL_{IN}$. Frequency domain data for real I and imaginary Q channels (complex representation) are provided as inputs to the CIBs. The frequency domain data can be referred to as frequency bin data. In this case, the digital signal $DIGITAL_{IN}$ for each CIB corresponds to the appropriate periodic sine or cosine waveform and each CIB is operated in the linear gain mode. Since the CIB elements (CIB #1 to CIB #8) have current outputs, the Fourier integral/sum can be realized implicitly by combining CIB outputs at a node labeled $x(t)_{OUT}$.

While illustrated with the real part of a 4-point analog IDFT, the principles and advantages can be applied to an arbitrary value of M points and complex transforms. In one embodiment, an M-point complex IDFT can be formed with 4M CIBs, since four CIB elements are used to form a single complex multiplication (real multiplication by sine and by cosine and imaginary multiplication by sine and by cosine).

Robust Data Communication in a Hostile Environment

Robust data communication for a hostile environment is another situation in which the ASPS is applicable. The ASPS can use CIBs to implement IDFT and DFT operations for orthogonal frequency division multiplexing (OFDM). For example, used in conjunction with standard analog bandpass filters, the ASPS can be configured to implement a jammer resilient communication receiver based on a Multi-Tone, Concatenated Spread Spectrum (MT-CSS) modulation scheme, such as that disclosed in U.S. patent application Ser. No. 12/850,500, filed Aug. 4, 2010, the entirety of which is incorporated by reference herein. The analog filter bank provides jammer isolation and can prevent an asynchronous jammer from disrupting the entire receive signal, which can occur through Fourier transform spectral leakage.

The ASPS can advantageously perform IDFT and DFT operations using algorithms implemented by low-power analog circuits. The MT-CSS system combines multi-tone modulation (OFDM) with pseudo-noise (PN) code spreading and frequency interleaving. The PN sequence spreading and frequency interleaving operations of an MT-CSS system provide jammer immunity by allowing data bits to be spread across multiple tones. This enables data lost in jammed tones to be recovered from information extracted from tones that lie outside the region affected by the jammer.

Figure 4:
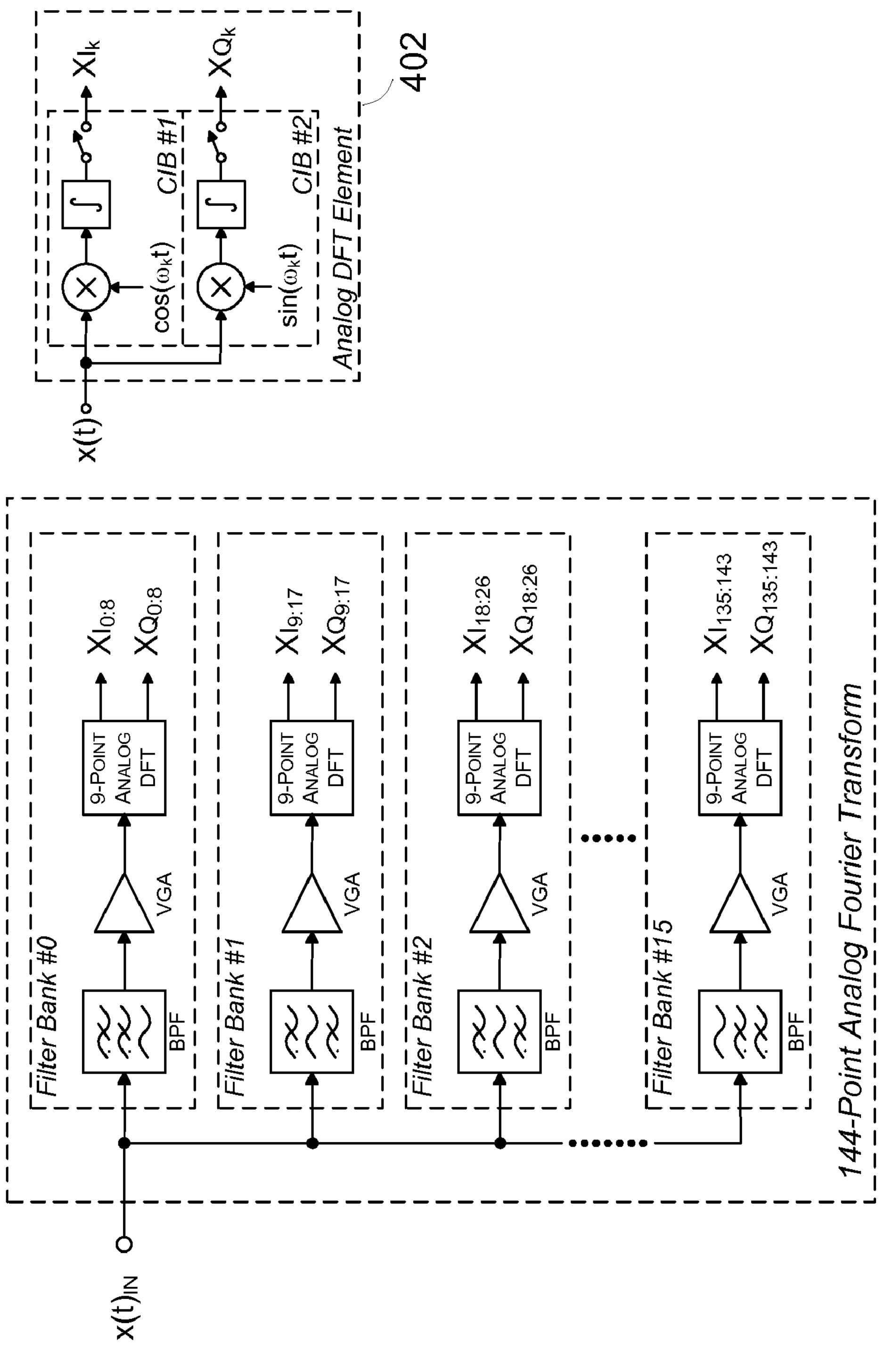
FIG. 4 illustrates an example of an analog filter bank and 144-point analog discrete Fourier transform.

A block diagram for the analog filter banks and DFT portions of an MT-CSS receiver or other receiver is illustrated in FIG. 4. Two CIBs can be used to form the real part of a single complex DFT element 402 (i.e., a quadrature DFT element). In contrast to the IDFT example of FIG. 3 in which the Fourier integral is implicitly realized via a current summing node, the DFT Fourier integral is an explicit operation realized via the integration capability or integration mode of the CIB as illustrated in FIG. 4.

Typically, a receive signal is received by an antenna and downconverted to a baseband signal. The input signal $x(t)_{IN}$ illustrated in FIG. 4 is a baseband signal that is provided as an input to the filter banks. Each filter bank has an analog bandpass filter, a variable gain amplifier, and an analog DFT processor implemented with CIBs. The passband of the analog bandpass filters can vary among the filter banks.

In this case, the input to the CIB integrator amplifier is the product of a receive baseband analog input x(t) and a periodic sinusoidal reference $\{\cos(\omega_k t)$ or $\sin(\omega_k t)\}$ as shown in the quadrature DFT element 402. In the FIG. 4 example, the receive band of the input signal $x(t)_{IN}$ is divided into 16 banks of nine carriers each, for demodulation of the receive MT-CSS by a 144-point analog DFT.

Figure 5:
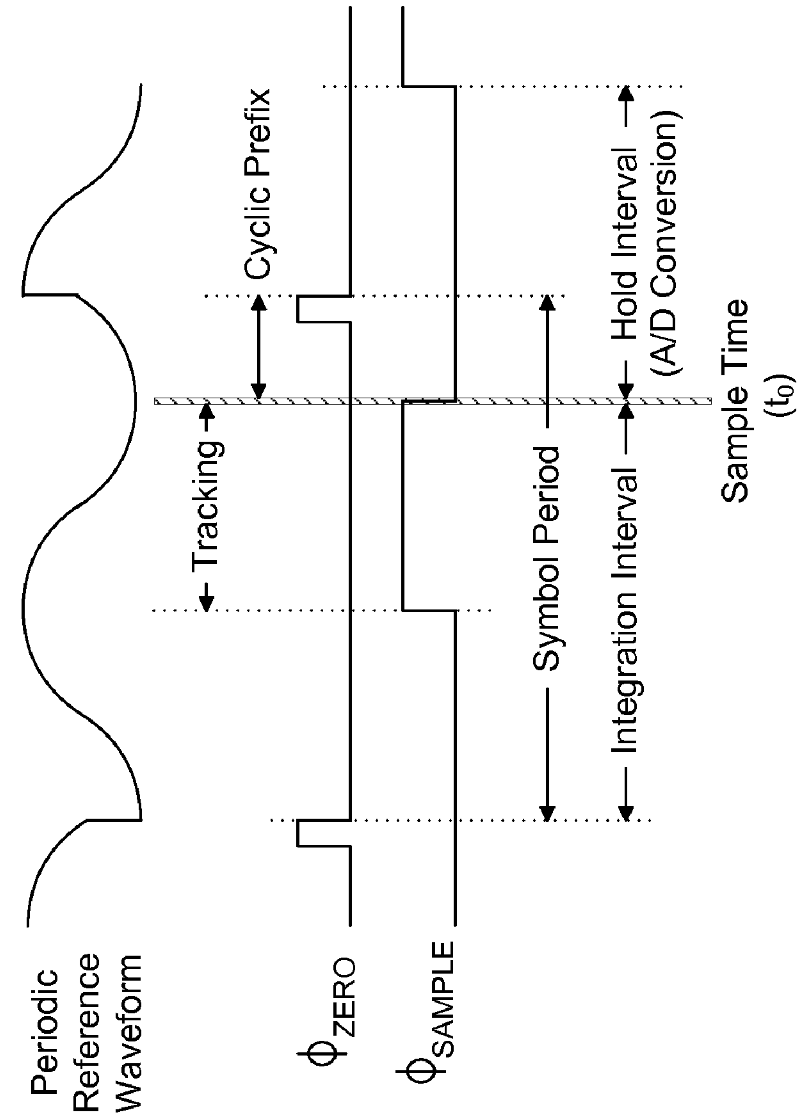
FIG. 5 illustrates an example of CIB timing.

As a result of the multi-tone format of the MT-CSS signaling protocol, the group delay distortion/dispersion and the passband ripple of the analog passband filters of the analog filter bank can be effectively mitigated using a composite equalization approach that uses a cyclic prefix and a single-tap-per-tone, frequency-domain adaptive filter. Therefore, the analog filter bank can be implemented using analog bandpass filters, with no special requirements for the anti-aliasing or perfect reconstruction properties ordinarily associated with standard filter bank processing schemes. The timing diagram in FIG. 5 illustrates how the cyclic prefix equalization operation is implemented through appropriate design of the CIB periodic reference waveform and appropriate choice of CIB integration period and sample time.

Simulation results indicate that for a robust data communication system of the type described above, a link margin loss of less than 2 dB occurs in the presence of a hostile jammer having bandwidth up to 10% of the receive bandwidth, and power up to 30 dB greater than that of the receive signal (J/S=30 dB).

Operational Transconductance Amplifier (OTA) Considerations

The OTA 110 described earlier in connection with FIG. 1 ideally has infinite input resistance and infinite open-loop gain. Under ideal conditions, the OTA transfer function is modeled in Equation 5.

$$I_{OUT} = g'_m \cdot Z_{FBK} \cdot I_{IN} \qquad \text{Equation 5}$$

The ideal transfer function is the product of three values: 1) a transconductance $g'_m$; 2) an impedance $Z_{FBK}$ that in an exemplary design is associated with an OTA linear feedback loop and has a frequency dependent value equal to $(j2\pi fC_1)^{-1}$; and 3) an input current $I_{IN}$ that in the illustrated embodiment is generated by the switched network of voltage-controlled current sources 102, 104, 106, 108 (FIG. 1).

Accounting for finite input resistance $R_{IN}$ and finite open-loop gain A, an example of an actual OTA transfer function is modeled in Equation 6.

$$I_{OUT} = g'_m \cdot \frac{A \cdot Z_{FBK} \cdot R_{IN}}{Z_{FBK} + (A+1) \cdot R_{IN}} \cdot I_{IN} \quad \text{Equation 6}$$

According to Equation 6, variations or component tolerances associated with finite OTA input resistance ($R_{IN}$) and finite OTA open-loop gain (A) can affect the accuracy, or precision, of the OTA output current $I_{OUT}$. The actual dependencies of output current $I_{OUT}$ on input resistance $R_{IN}$ and of output current $I_{OUT}$ on open-loop gain A are found by differentiation, yielding Equation 7 and Equation 8, respectively.

$$\Delta I_{OUT} = \left[ g'_m \cdot \frac{A \cdot Z_{FBK}^2}{(Z_{FBK} + (A+1) \cdot R_{IN})^2} \cdot I_{IN} \right] \cdot \Delta R_{IN} \quad \text{Equation 7}$$

$$\Delta I_{OUT} = \left[ g'_m \cdot \frac{Z_{FBK}^2 \cdot R_{IN} + Z_{FBK} \cdot R_{IN}^2}{(Z_{FBK} + (A+1) \cdot R_{IN})^2} \cdot I_{IN} \right] \cdot \Delta A \quad \text{Equation 8}$$

The Equation 7 indicates that the OTA output current $I_{OUT}$ is independent of input resistance $R_{IN}$ for sufficiently large open-loop gain A as expressed in Equation 9.

$$\lim_{A \to \infty} \left\{ g'_m \cdot \frac{A \cdot Z_{FBK}^2}{(Z_{FBK} + (A+1) \cdot R_{IN})^2} \cdot I_{IN} \right\} = 0 \quad \text{Equation 9}$$

In general, how large the OTA input resistance $R_{IN}$ and the OTA open-loop gain A need to be depends on the desired precision for the OTA output current $I_{OUT}$. For applications using 12-bits of precision or more, such that the input current $I_{IN}$ value is accurate to $2^{-12}$ parts or 0.025%, the OTA open-loop gain (A) is preferably greater than 80 dB and the OTA input resistance ($R_{IN}$) is preferably more than 10,000 ohms. For applications using 10-bits of precision or more, such that the input current $I_{IN}$ value is accurate to $2^{-10}$ parts or ~0.1%, the OTA open-loop gain (A) is preferably greater than 70 dB and the OTA input resistance ($R_{IN}$) is preferably more than 5,000 ohms.

Since the accuracy of the OTA output current $I_{OUT}$ depends directly on the accuracy of the OTA input current $I_{IN}$, and since the OTA input current $I_{IN}$ is produced by the network of voltage-controlled current sources 102, 104, 106, 108 (FIG. 1), the current sources 102, 104, 106, 108 of the network producing $I_{IN}$ are preferably matched to the same level of accuracy as the output current $I_{OUT}$. Therefore, for applications using 12-bits of precision such that the OTA input current value is accurate to $2^{-12}$ parts or 0.025%, the voltage-controlled current sources 102, 104, 106, 108 are preferably matched to about 0.025%. For applications requiring 10-bits of precision, such that the OTA input current value is accurate to $2^{-10}$ parts or 0.1%, the voltage-controlled current sources are preferably matched to about 0.1%. The voltage-controlled current source matching described in the foregoing can be realized though careful circuit design and layout techniques, through precisely controlled integrated circuit fabrication processes, and/or through dynamic component compensation and calibration methods. In one embodiment, the voltage-controlled current sources 102, 104, 106, 108 (FIG. 1) share a circuit configuration, which is instantiated as appropriate to implement binary weighting or unary weighting. In one embodiment, the voltage-controlled current sources (sinks) 102, 104, 106, 108 are implemented using active current mirrors. But alternatively, the voltage-controlled current sources (sinks) can be implemented using any prior art method for generating current based on a voltage reference, including but not limited to, operational amplifier current sources, Widlar current sources and Wilson current sources.

As used herein, a "node" means any internal or external reference point, connection point, junction, signal line, conductive element, or the like at which a given signal, logic level, voltage, data pattern, current, or quantity is present. Furthermore, two or more nodes may be realized by one physical element (and two or more signals can be multiplexed, modulated, or otherwise distinguished even though received or provided as an output at a common node).

Various embodiments have been described above. Although described with reference to these specific embodiments, the descriptions are intended to be illustrative and are not intended to be limiting. Various modifications and applications may occur to those skilled in the art.

The invention claimed is:

1. An apparatus comprising a programmable analog circuit, the programmable analog circuit comprising:

- an analog input node configured to receive an analog input signal;
- a plurality of controlled current sources, wherein each controlled current source has an output current that is controlled by the analog input signal;
- a plurality of current-steering switches, wherein each current-steering switch has at least a first switch node and a second switch node, wherein each current-steering switch is paired with a corresponding controlled current source of the plurality of controlled current sources so that each controlled current source output is coupled to a respective first switch node, wherein each current-steering switch is configured to selectively enable or disable conduction between the first switch node and the second switch node based at least partly on a state of a respective a digit of a digital signal; and
- an output transconductance amplifier (OTA) circuit having a first input coupled to second switch nodes of the plurality of current-steering switches;
- wherein the OTA circuit further comprises an integration capacitor, integration reset switch, sampling switch, and holding capacitor, wherein the OTA circuit has at least a linear gain mode, an integration mode, and a sample-and-hold mode.

2. The apparatus of claim 1, wherein each current-steering switch further comprises at least a third switch node coupled to a voltage reference, wherein each current-steering switch is configured to selectively enable or disable conduction between the first switch node and the second switch node and disable or enable conduction between the first switch node and the third switch node based at least partly on a state of a respective a digit of a digital signal.

3. The apparatus of claim 1, wherein the controlled-current sources comprise voltage-controlled current sources controlled by a voltage of the analog input signal.

4. An apparatus comprising a programmable analog circuit, the programmable analog circuit comprising:

- an analog input node configured to receive an analog input signal;

a plurality of controlled current sources, wherein each controlled current source has an output current that is controlled by the analog input signal;

a plurality of current-steering switches, wherein each current-steering switch has at least a first switch node and a second switch node, wherein each current-steering switch is paired with a corresponding controlled current source of the plurality of controlled current sources so that each controlled current source output is coupled to a respective first switch node, wherein each current-steering switch is configured to selectively enable or disable conduction between the first switch node and the second switch node based at least partly on a state of a respective a digit of a digital signal; and an output transconductance amplifier (OTA) circuit having a first input coupled to second switch nodes of the plurality of current-steering switches;

wherein the current sources of the plurality of controlled current sources are binary weighted such that successive current sources differ in output current by a factor of two, wherein the digits of the digital signal comprise bits, wherein the bit of the digital signal controlling a particular current-steering switch of the plurality of current-steering switches matches the binary weighting of the paired controlled current source.

5. The apparatus of claim 1, wherein the current sources of the plurality of controlled current sources are unary weighted, such that successive current sources are equal and arranged in a manner that minimizes current source matching errors caused by wafer gradients associated with integrated circuit processes.

6. The apparatus of claim 1, wherein the apparatus is embodied in an array of a plurality of programmable analog circuits, wherein:

inputs and outputs of the plurality of programmable analog circuits are configurable to be interconnected in combination, such that:

inputs can be a combination of external signals;

inputs can be a combination of outputs from the programmable analog circuits;

inputs can be a combination of external signals and of outputs from the programmable analog circuits;

outputs can be a combination of external signals;

outputs can be a combination of outputs from the programmable analog circuits; and outputs can be a combination of external signals and of outputs from the programmable analog circuits.

7. The apparatus of claim 1, wherein the apparatus is configured to compute an N-point inverse Fourier Transform of frequency bin data in an analog manner, the apparatus further comprising 4N programmable analog circuits arranged in N groups of four, wherein the programmable analog circuits are configured to operate in a linear gain mode, wherein data from a frequency bin is provided to a corresponding analog input node of a programmable analog circuit, and wherein the digital signal for a programmable analog circuit corresponds to a sine wave or a cosine wave of the frequency corresponding to the frequency bin for the programmable analog circuit, wherein outputs of the programmable analog circuits are summed in a node to form an output signal.

8. The apparatus of claim 1, wherein the apparatus is configured to compute an N-point Fourier Transform of an analog signal in an analog manner, the apparatus further comprising 4N programmable analog circuits arranged in N groups of four, wherein the programmable analog circuits are configured to operate in an integration mode, wherein the analog signal is provided to the analog input nodes of the programmable analog circuits, and wherein the digital signal for a programmable analog circuit corresponds to a sine wave or a cosine wave corresponding to a frequency bin being computed by the programmable analog circuit.

9. A method of providing a programmable analog circuit, the method comprising:

receiving an analog input signal at an analog input node;

providing a plurality of controlled currents, wherein each controlled current is controlled by the analog input signal;

selectively switching the controlled currents based at least partly on states of digits of a digital signal; and summing the selectively switched controlled currents at an input node of an output transconductance amplifier (OTA) circuit;

wherein the OTA circuit further comprises an integration capacitor, integration reset switch, sampling switch, and holding capacitor, wherein the OTA circuit has at least a linear gain mode, an integration mode, and a sample-and-hold mode.

10. The method of claim 9, further comprising selectively switching each controlled current to either the input node or a voltage reference based on the state of a respective digit of the digital signal.

11. The method of claim 9, wherein the controlled currents are controlled by a voltage of the analog input signal.

12. A method of providing a programmable analog circuit, the method comprising:

receiving an analog input signal at an analog input node;

providing a plurality of controlled currents, wherein each controlled current is controlled by the analog input signal;

selectively switching the controlled currents based at least partly on states of digits of a digital signal; and summing the selectively switched controlled currents at an input node of an output transconductance amplifier (OTA) circuit;

wherein the plurality of controlled currents are binary weighted such that successive currents differ by a factor of two, wherein the digits of the digital signal comprise bits, wherein the bit of the digital signal controlling switching of a particular controlled current matches the binary weighting of the particular controlled current.

13. The method of claim 9, wherein the controlled currents are unary weighted such that successive currents are equal.

14. A method of providing a programmable analog circuit, the method comprising:

receiving an analog input signal at an analog input node;

providing a plurality of controlled currents, wherein each controlled current is controlled by the analog input signal;

selectively switching the controlled currents based at least partly on states of digits of a digital signal;

summing the selectively switched controlled currents at an input node of an output transconductance amplifier (OTA) circuit; and computing an N-point inverse Fourier Transform of frequency bin data in an analog manner, the method further comprising:

operating a plurality of output transconductance amplifiers (OTAs) in linear gain mode;

providing frequency bin data as inputs to multiple corresponding analog input nodes;

providing a sine wave or a cosine wave of the frequency corresponding to the frequency bin as the digital signal; and summing outputs of OTAs in a node to form an output signal.

15. A method of providing a programmable analog circuit, the method comprising:

receiving an analog input signal at an analog input node;

providing a plurality of controlled currents, wherein each controlled current is controlled by the analog input signal;

selectively switching the controlled currents based at least partly on states of digits of a digital signal;

summing the selectively switched controlled currents at an input node of an output transconductance amplifier (OTA) circuit; and computing an N-point Fourier Transform of an analog signal in an analog manner, the method further comprising:

operating a plurality of output transconductance amplifiers (OTAs) in an integration mode;

providing the analog signal to analog input nodes; and providing a sine wave or a cosine wave of the frequency corresponding to a frequency bin as the digital signal for computation of the frequency bin.

16. An apparatus for providing a programmable analog circuit, the apparatus comprising:

an analog input node configured to receive an analog input signal;

means for providing a plurality of controlled currents, wherein each controlled current is controlled by the analog input signal;

means for selectively switching the controlled currents based at least partly on states of digits of a digital signal;

means for summing the selectively switched controlled currents; and an output transconductance amplifier (OTA) circuit having an input coupled to the selectively switched controlled currents;

wherein the plurality of controlled currents are binary weighted such that successive currents differ by a factor of two, wherein the digits of the digital signal comprise bits, wherein the bit of the digital signal controlling switching of a particular controlled current matches the binary weighting of the particular controlled current.

17. The apparatus of claim 16, wherein the selectively switching means further comprises means for selectively switching each controlled current to either the input node or a voltage reference based on the state of a respective digit of the digital signal.

* * * * *